(12) United States Patent
Yuan et al.

(10) Patent No.: US 11,615,644 B2
(45) Date of Patent: Mar. 28, 2023

(54) FACE DETECTION TO ADDRESS PRIVACY IN PUBLISHING IMAGE DATASETS

(71) Applicant: eBay Inc., San Jose, CA (US)

(72) Inventors: Jiangbo Yuan, Newark, CA (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 338 days.

(21) Appl. No.: 16/923,969

(22) Filed: Jul. 8, 2020

(65) Prior Publication Data

US 2022/0012471 A1 Jan. 13, 2022

(51) Int. Cl.
| | |
|---|---|
| G06K 9/62 | (2022.01) |
| G06V 40/16 | (2022.01) |
| G06N 20/00 | (2019.01) |
| G06F 21/62 | (2013.01) |
| G06V 10/82 | (2022.01) |

(52) U.S. Cl.
CPC ........ *G06V 40/169* (2022.01); *G06F 21/6254* (2013.01); *G06K 9/6256* (2013.01); *G06N 20/00* (2019.01); *G06V 10/82* (2022.01); *G06V 40/172* (2022.01)

(58) Field of Classification Search
CPC .................. G06T 5/002; G06F 21/6254; G06F 21/60–21/645; G06V 40/16–40/179
See application file for complete search history.

(56) References Cited

U.S. PATENT DOCUMENTS

| | | |
|---|---|---|
| 2013/0236070 A1 | 9/2013 | Sliwinski |
| 2016/0132719 A1* | 5/2016 | Fithian ................. G06V 40/172 |
| | | 345/647 |

(Continued)

FOREIGN PATENT DOCUMENTS

CN 108171191 A 6/2018

OTHER PUBLICATIONS

Greenman, "Comparison of advertising strategies between the indoor tanning and tobacco industries", J AM ACAD Dermatol volume 62, No. 4, copyright 2009 by the American Academy of Dermatology, Inc. doi:10.1016/j.jaad.2009.02.045, pp. 685.e1-685.e18. (Year: 2009).*

(Continued)

*Primary Examiner* — Brian Werner
(74) *Attorney, Agent, or Firm* — Holland & Hart LLP

(57) ABSTRACT

Methods for face detection to address privacy in publishing image datasets is described. A method may include face classification in an online marketplace. A server system may receive, from a seller user device, a listing including an image for the online marketplace. The server system may classify, by at least one processor that implement a distribution-balance trained machine learning model, each human face candidate within the image as being one of a private human face or a non-private human face. The server system may receive, from a buyer user device, a search query that is mapped to the listing in the online marketplace. The server system may transmit, to the buyer user device, a query response including the listing that includes the image determined to not include any private human faces or obscures any private human faces within the image based on the classifying.

20 Claims, 11 Drawing Sheets

(56) References Cited

U.S. PATENT DOCUMENTS

2019/0147250 A1* 5/2019 Zhang .................. G06V 20/41
                                                    382/224
2019/0392268 A1 12/2019 Tariq et al.

OTHER PUBLICATIONS

"Privacy Principles for Facial Recognition Technology in Commercial Applications", Future of Privacy Forum, Retrieved from internet URL: https://fpf.org/wp-content/uploads/2019/03/Final-Privacy-Principles-Edits-1.pdf, Sep. 2018, 24 Pages.

MTCCN-Keras, Retrieved from internet URL: https://github.com/ipazc/mtcnn, 2020, 4 Pages.

Guo et al., "MS-Celeb-1M: A Dataset and Benchmark for Large-Scale Face Recognition", Computer Vision and Pattern Recognition (cs.CV), CoRR abs/1607.08221 (2016), Retrieved from internet URL: https://arxiv.org/abs/1607.08221, Jul. 27, 2016, 17 Pages.

He et al., "Deep Residual Learning for Image Recognition", Computer Vision and Pattern Recognition (cs.CV), arXiv preprint arXiv:1512.03385, Retrieved from internet URL: https://arxiv.org/abs/1512.03385, Dec. 10, 2015, 12 Pages.

Lin et al., "Focal Loss for Dense Object Detection", Computer Vision and Pattern Recognition (cs.CV), CoRR abs/1708.02002. arXiv:1708.02002, Retrieved form internet URL: https://arxiv.org/abs/1708.02002, Aug. 7, 2017, 10 Pages.

Stewart et al., "End-to-End People Detection in Crowded Scenes", IEEE Conference on Computer Vision and Pattern Recognition (CVPR), 2016, pp. 2325-2333.

Wang et al., "Deep Face Recognition: A Survey", Computer Vision and Pattern Recognition (cs.CV), CoRR abs/1804.06655. arXiv:1804.06655, Retrieved from internet URL: https://arxiv.org/abs/1804.06655, Apr. 18, 2018, 17 Pages.

Yang et al., "Wider Face: A Face Detection Benchmark", IEEE Conference on Computer Vision and Pattern Recognition (CVPR), 2016, pp. 5525-5533.

Zhang et al., "Accurate Face Detection for High Performance", Computer Vision and Pattern Recognition (cs.CV), CoRR abs/1905.01585 (2019), arXiv:1905.01585, Retrieved from internet URL: https://arxiv.org/abs/1905.01585, May 5, 2019, 9 Pages.

Zhang et al., "Joint Face Detection and Alignment Using Multitask Cascaded Convolutional Networks", IEEE Signal Processing Letters 23, Oct. 10, 2016, pp. 1499-1503.

* cited by examiner

FACE DETECTION TO ADDRESS PRIVACY IN PUBLISHING IMAGE DATASETS

FIELD OF TECHNOLOGY

The present disclosure relates generally to database systems and data processing, and more specifically to face detection to address privacy in publishing image datasets.

BACKGROUND

Computer networks permit the transport of data between interconnected computers. Search engine technology permits a user to obtain information from a vast array of sources available via a computer network. A search engine may be a program that searches for and identifies content in a database that correspond to keywords or characters input by the user, and may return websites available via the Internet based on the search. To generate a search, a user may interact with a user device, such as a computer or mobile phone, to submit a search query via a search engine. The search engine may execute the search and display results for the search query based on communication with other applications and servers. The search results may include images uploaded by a seller. The images may include private and non-private faces. Display of private faces in search listings may lead to privacy concerns.

SUMMARY

A method of face classification in an online marketplace is described. The method may include receiving a listing including at least one image for the online marketplace, classifying, by at least one processor that implements a distribution-balance trained machine learning model, each human face candidate within the at least one image as being one of a private human face or a non-private human face, receiving, from a user device, a search query that is mapped to the listing in the online marketplace, and transmitting, to the user device, a query response including the listing that includes a first image of the at least one image determined to not include any private human faces or obscures any private human faces within the first image based on the classifying.

An apparatus for face classification in an online marketplace is described. The apparatus may include a processor, memory coupled with the processor, and instructions stored in the memory. The instructions may be executable by the processor to cause the apparatus to receive a listing including at least one image for the online marketplace, classify, by at least one processor that implements a distribution-balance trained machine learning model, each human face candidate within the at least one image as being one of a private human face or a non-private human face, receive, from a user device, a search query that is mapped to the listing in the online marketplace, and transmit, to the user device, a query response including the listing that includes a first image of the at least one image determined to not include any private human faces or obscures any private human faces within the first image based on the classifying.

Another apparatus for face classification in an online marketplace is described. The apparatus may include means for receiving a listing including at least one image for the online marketplace, classifying, by at least one processor that implements a distribution-balance trained machine learning model, each human face candidate within the at least one image as being one of a private human face or a non-private human face, receiving, from a user device, a search query that is mapped to the listing in the online marketplace, and transmitting, to the user device, a query response including the listing that includes a first image of the at least one image determined to not include any private human faces or obscures any private human faces within the first image based on the classifying.

A non-transitory computer-readable medium storing code for face classification in an online marketplace is described. The code may include instructions executable by a processor to receive a listing including at least one image for the online marketplace, classify, by at least one processor that implements a distribution-balance trained machine learning model, each human face candidate within the at least one image as being one of a private human face or a non-private human face, receive, from a user device, a search query that is mapped to the listing in the online marketplace, and transmit, to the user device, a query response including the listing that includes a first image of the at least one image determined to not include any private human faces or obscures any private human faces within the first image based on the classifying.

Some examples of the method, apparatuses, and non-transitory computer-readable medium described herein may further include operations, features, means, or instructions for outputting a set of one or more images of the at least one image, or an indication of the one or more images in the set, that each include at least one private human face based on the classifying.

Some examples of the method, apparatuses, and non-transitory computer-readable medium described herein may further include operations, features, means, or instructions for outputting a set of one or more images of the at least one image, or an indication of the one or more images in the set, determined to not include any private human faces based on the classifying.

Some examples of the method, apparatuses, and non-transitory computer-readable medium described herein may further include operations, features, means, or instructions for receiving the search query that may be mapped to a listing that includes the first image, and transmitting, based on the search query, the query response including the listing and the first image based on each human face candidate within the first image being classified as a non-private human face.

Some examples of the method, apparatuses, and non-transitory computer-readable medium described herein may further include operations, features, means, or instructions for receiving the search query that may be mapped to a listing that includes a second image of the at least one first image, and transmitting, based on the search query, the query response including the listing without the second image based on at least one human face candidate within the second image being classified as a private human face.

Some examples of the method, apparatuses, and non-transitory computer-readable medium described herein may further include operations, features, means, or instructions for applying a machine learning model to a set of training images to generate a set of predicted scores for the set of training images, determining a distribution-balance value corresponding to the set of training images, and training the machine learning model to generate the distribution-balance trained machine learning model based on the determined distribution-balance value.

In some examples of the method, apparatuses, and non-transitory computer-readable medium described herein, each training image of the set of training images may be assigned a training score to indicate that the respective training image includes at least one private human face or at least one non-private human face without any private human faces.

In some examples of the method, apparatuses, and non-transitory computer-readable medium described herein, determining the distribution-balance value may include operations, features, means, or instructions for determining the distribution-balance value based on a ratio of private to non-private human faces in the set of training images.

In some examples of the method, apparatuses, and non-transitory computer-readable medium described herein, training the machine learning model may include operations, features, means, or instructions for training the machine learning model, based on the determined distribution-balance value, to generate an updated machine learning model, applying the updated machine learning model to the set of training images to generate a second set of predicted scores for the set of training images, determining an aggregate error value based on the second set of predicted scores and a set of training scores for the plurality of training images, and training the updated machine learning model to generate the distribution-balance trained machine learning model based on the aggregate error value.

In some examples of the method, apparatuses, and non-transitory computer-readable medium described herein, the non-private human face includes a non-human face, a published human face, a public figure human face, a drawing of a human face, or any combination thereof.

DETAILED DESCRIPTION

Figure 1:
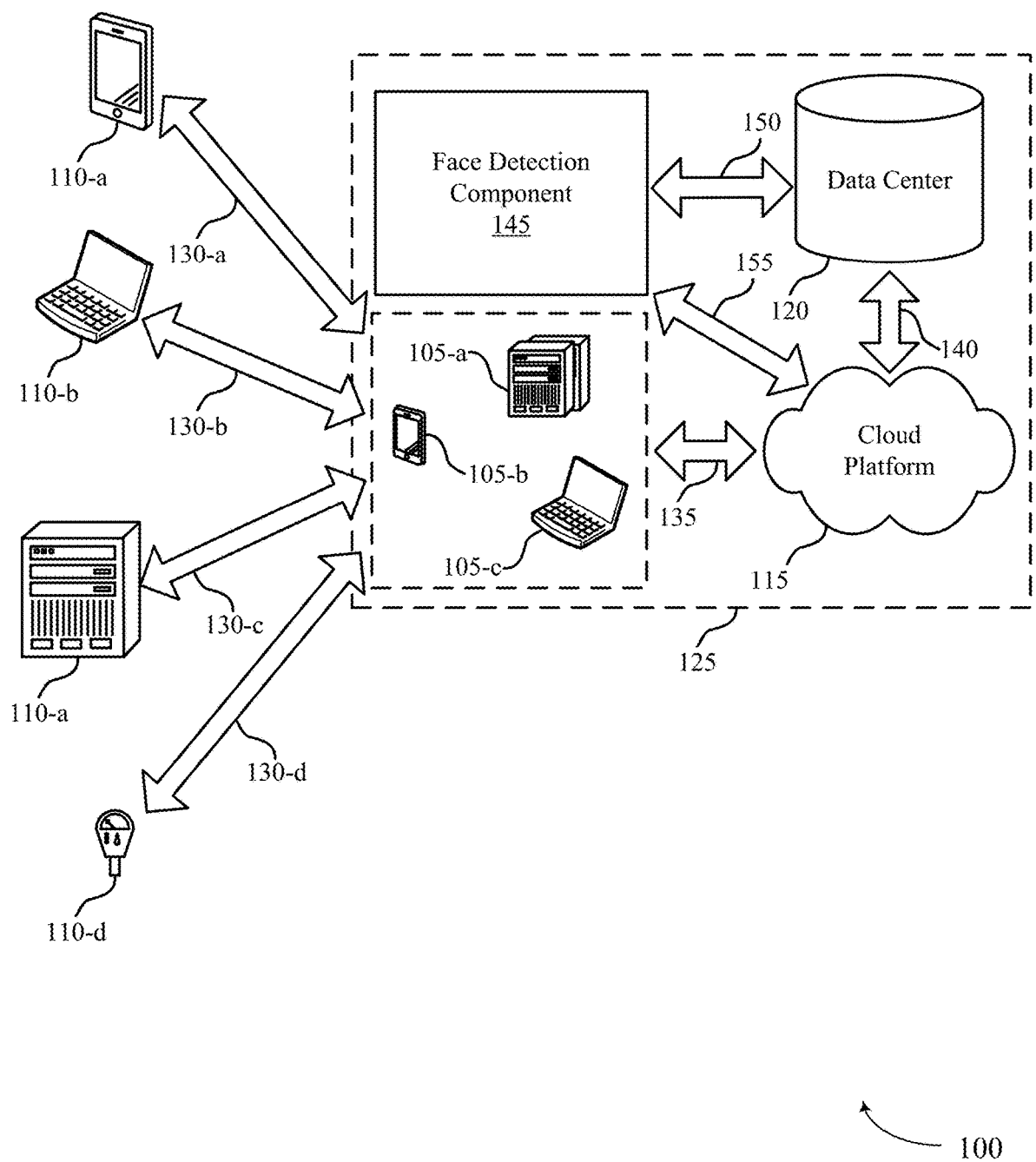
FIG. 1 illustrates an example of a server system that supports face detection to address privacy in publishing image datasets in accordance with aspects of the present disclosure.

A platform of an online marketplace may receive seller-uploaded listings of products for sale. The listings may include a product description, a title, and an image of the product. In some cases, the image may be an image taken by the seller, or may be a publicly available image of the product. The image may include a human face, and may be a private human face or a non-private human face. A private human face may be an example of a not-safe-to-share (NSTS) face, and may be a child's face, or another private citizen's face. A public face may be a human face in published media, such as a magazine, compact disk (CD), or digital media disk (DVD), or an animated human face, such as a logo.

A potential buyer may enter a search query into a user device, and may receive a search results page with listings and images. In order to avoid privacy concerns and protect privacy, the search results page may filter out private human faces, such as masking the at least one private human face in the image by blurring, covering, or otherwise obscuring any included private human faces. In order to determine which images contain private human faces, a machine learning model may be trained to classify images in product listings as containing private human faces, or non-private human faces, or both. The private human faces may be non-publishable, and the non-private faces may be publishable.

The machine learning model may be trained with a two-stage process that improves the accuracy of the classification, and decreases the number of false positives detected. Initially, a set of training images are selected and a training score is assigned to each image. The training images may be used in the first stage to train the machine learning model to detect human faces within the images, and return detection bounding boxes (e.g., boxes identifying where faces are in the images). The detection bounding boxes may locate faces in images, in cases where faces exist in the image. A face detection framework may be used by the machine learning model in this first stage. An example of the face detection framework may be a Multitask Cascaded Convolutional Network (MTCNN).

The machine learning model may iteratively generate corresponding predicted scores for each of the training images, where the predicted score indicates a likelihood that a real human face is detected in the detection bounding box. For example, a score of '0' may be assigned to each training image that does not include any images of a human face, and a score of '1' may be assigned to each training image that includes at least one human face. The machine learning model may also receive, as an input, an acceptable aggregate error rate for the first training stage. In the first stage, training of the machine learning model may involve the machine learning model iteratively generating the predicted scores for the training images attempting to achieve the acceptable aggregate error rate (e.g., minimize the aggregate error or until it satisfies a threshold) between the predicted scores and the training scores for the set of training images. Once the acceptable aggregate error rate has been achieved, the first training stage is complete. The output of the first training stage may be a set of images with human faces detected in the images.

At the end of the first training stage, in some cases there may be a high false positive rate of the machine learning model. A false positive at the first stage may be identified when an image is misclassified as including a human face when no faces are presented in the image. Moreover, addressing the privacy of faces included may not be the focus in the first training stage.

The second stage of training the machine learning model may include training the model to detect private human faces from within the set of human faces identified in the images by the first stage. For example, the machine learning model may assign a score of '0' to each training image that does not include any private human faces, and may assign a score of '1' to each training image that includes at least one private human face. The second stage may also attempt to reduce the rate of false positives at the second stage which may involve reducing a false positive rate based on recognizing "non-real-face" detection results from the first stage. To correct for the false positives in the second stage, the machine learning model may receive as input an identification of which images from the first output image set were a false-positive. For example, the machine learning model may receive as input a second set of images for reprocessing by the machine learning model for correcting the false positives (e.g., with corrected prediction scores).

In some cases, a human may annotate the output images by the first stage with an indication of whether the human faces identified in the images by the first stage are private faces or non-private faces to create the second set of images for training of the machine learning model in the second stage. The second set of images may indicate any non-private faces with false positive detections from the first stage-trained machine learning model, as well as any safe-to-share (STS) (e.g., publishable) human faces, such as celebrity faces or other public human faces. The second stage of the face classification model may be trained based on the second set of images (e.g., a second set of images identifying private and non-private human faces with a score, such as a score from 0 to 1, and identifying any false positive detections by the first stage for each image).

To reduce a false positive rate by the second training stage, the machine learning model may be trained by applying a distribution-balance function for reducing an imbalance distribution for image data used to train the machine learning model in the second stage. An imbalance distribution in training data may occur when the training images include a disproportionate number of non-private faces (or non-faces) relative to private faces. Within the training data, the non-private face samples are negatives and the private face samples are positives. In some examples, the number of negative samples tends to naturally occur more often than the number of positive samples in a training image set. The imbalance distribution may thus be an imbalance between positive and negative samples in the training image data, and may result in an unacceptably high false positive rate occurring for face classifications by the machine learning model. For example, the machine learning model trained with training data having too high of an imbalance distribution in a training image set may result in the model having too high of a false positive rate. Too high of a false positive rate may occur when the machine learning model identifies a disproportionate number of human faces as private human faces that actually are non-private human faces, or a disproportionate number of human faces as non-private human faces that are actually private human faces, or the like. In some examples, the imbalance distribution may be of concern because successfully identifying non-private faces (negative samples) may result in better training of the machine learning model than successfully identifying the private faces (positive samples).

A distribution-balance function may be used in the second stage when training the machine learning model to manage the imbalance distribution, based on the ratio of private faces to non-private faces in the training image set. Examples of distribution-balance functions include, for example, a binary focal loss (BFL) technique and a class-balanced loss based model (e.g., a class-balanced loss based on effective number of samples). The machine learning model, when being trained in the second stage using the distribution-balance function, may generate a predicted score for each of the images in the second set of images, and a magnitude of the difference between the predicted score of an image and a training score for the image may be determined. In the second stage, training of the machine learning model may continue until an aggregate of the magnitude of the difference across the set of images reaches an acceptable level (e.g., minimize the magnitude of the aggregate difference or until it satisfies a threshold).

The distribution-balance function may be a weighting applied to the aggregate of the difference of the magnitude when an imbalance distribution is observed in a set of training images. When the imbalance distribution does not satisfy a threshold (e.g., too high of a ratio of non-private human faces to private human faces in a training image set), the distribution-balance function may increase the aggregate of the magnitude of the difference, to increase the aggregate error. When the imbalance distribution satisfies a threshold (e.g., an acceptable ratio of private human faces to non-private human faces in a training image set), the distribution-balance function may not change or may nominally change the aggregate of the magnitude of the difference. Once the machine learning model is able to achieve the acceptable aggregate magnitude difference for the second set of images, the second training stage is complete indicating that the machine learning model has achieved a desired balance distribution between classifying human faces as private and non-private for the second set of images. As this point, the machine learning model may be considered a distribution-balance trained machine learning model.

After the second stage of training is complete, the machine learning model may be used to classify an image (i.e., a non-training image) as having at least one private human face (i.e., is non-publishable) or not having any private human faces (i.e., is publishable). For example, the distribution-balance trained machine learning model may be used to process a set of images to identify which images are publishable, and which are not. In some cases, the distribution-balance trained machine learning model may be applied to images associated with uploaded product listings of an online auction marketplace.

In other cases, the machine learning model may be applied to a large catalog of images when sellers create listings. Entities, may wish to share such images for research, open challenges, advertisement, branding, or business purposes. The distribution-balance trained machine learning model may be applied to an image dataset such that non-publishable images are identified to be filtered out, and publishable images remain in the dataset.

Aspects of the disclosure are initially described in the context of a database system. Aspects of the disclosure are then described in the context of application flow, a face detection process, a face classification process, a webpage, and a process flow. Aspects of the disclosure are further illustrated by and described with reference to apparatus diagrams, system diagrams, and flowcharts that relate to face detection to address privacy in publishing image datasets.

FIG. 1 illustrates an example of a system 100 that supports face detection to address privacy in publishing image datasets in accordance with various aspects of the present disclosure. The system 100 includes cloud clients 105, user devices 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a computing device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be part of a business, an enterprise, a non-profit, a startup, or any other organization type.

A cloud client 105 may facilitate communication between the data center 120 and one or multiple user devices 110 to implement an online marketplace. The network connection 130 may include communications, opportunities, purchases, sales, or any other interaction between a cloud client 105 and a user device 110. A cloud client 105 may access cloud platform 115 to store, manage, and process the data communicated via one or more network connections 130. In some cases, the cloud client 105 may have an associated security or permission level. A cloud client 105 may have access to certain applications, data, and database information within cloud platform 115 based on the associated security or permission level, and may not have access to others.

The user device 110 may interact with the cloud client 105 over network connection 130. The network may implement transfer control protocol and internet protocol (TCP/IP), such as the Internet, or may implement other network protocols. The network connection 130 may facilitate transport of data via email, web, text messages, mail, or any other appropriate form of electronic interaction (e.g., network connections 130-a, 130-b, 130-c, and 130-d) via a computer network. In an example, the user device 110 may be computing device such as a smartphone 110-a, a laptop 110-b, and also may be a server 110-c or a sensor 110-d. In other cases, the user device 110 may be another computing system. In some cases, the user device 110 may be operated by a user or group of users. The user or group of users may be a customer, associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support an online application. This may include support for sales between buyers and sellers operating user devices 110, service, marketing of products posted by buyers, community interactions between buyers and sellers, analytics, such as user-interaction metrics, applications (e.g., computer vision and machine learning), and the Internet of Things. Cloud platform 115 may receive data associated with generation of an online marketplace from the cloud client 105 over network connection 135, and may store and analyze the data. In some cases, cloud platform 115 may receive data directly from a user device 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or via network connection 130 between a user device 110 and the cloud client 105. Data center 120 may utilize multiple redundancies for security purposes. In some cases, the data stored at data center 120 may be backed up by copies of the data at a different data center (not pictured).

Server system 125 may include cloud clients 105, cloud platform 115, face detection component 145, and data center 120 that may coordinate with cloud platform 115 and data center 120 to implement an online marketplace. In some cases, data processing may occur at any of the components of server system 125, or at a combination of these components. In some cases, servers may perform the data processing. The servers may be a cloud client 105 or located at data center 120.

The face detection component 145 may communicate with cloud platform 115 via connection 155, and may also communicate with data center 120 via connection 150. The face detection component 145 may receive signals and inputs from user device 110 via cloud clients 105 and via cloud platform 115 or data center 140.

Some conventional systems may implement an online marketplace where a listing is displayed along with an image. In many cases, the image may include a private face uploaded by a seller that posted the listing. A private face may be a face of a minor, or of a person who has not given permission for their face to be posted online. A public face may include celebrity faces, logos with faces, CD or movie covers with faces, etc. The online marketplace server may determine to only display images of public human faces. In order to determine which faces are public, the face detection component 145 may classify faces in listings of the online marketplace.

The server system 125 including face detection component may receive a listing including at least one image for the online marketplace. The image may be received from a user device 110. The face detection component 145 may classify, by at least one processor that implements a distribution-balance trained machine learning model, each human face candidate within the at least one image as being one of a private human face or a non-private human face (e.g., a public face). The server system 125 including face detection component 145 may receive, from a user device 110, a search query that is mapped to the listing in the online marketplace. The server system 125 may transmit, to a user device 110, a query response including the listing that includes a first image of the at least one image determined to not include any private human faces within the first image based on the classifying.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
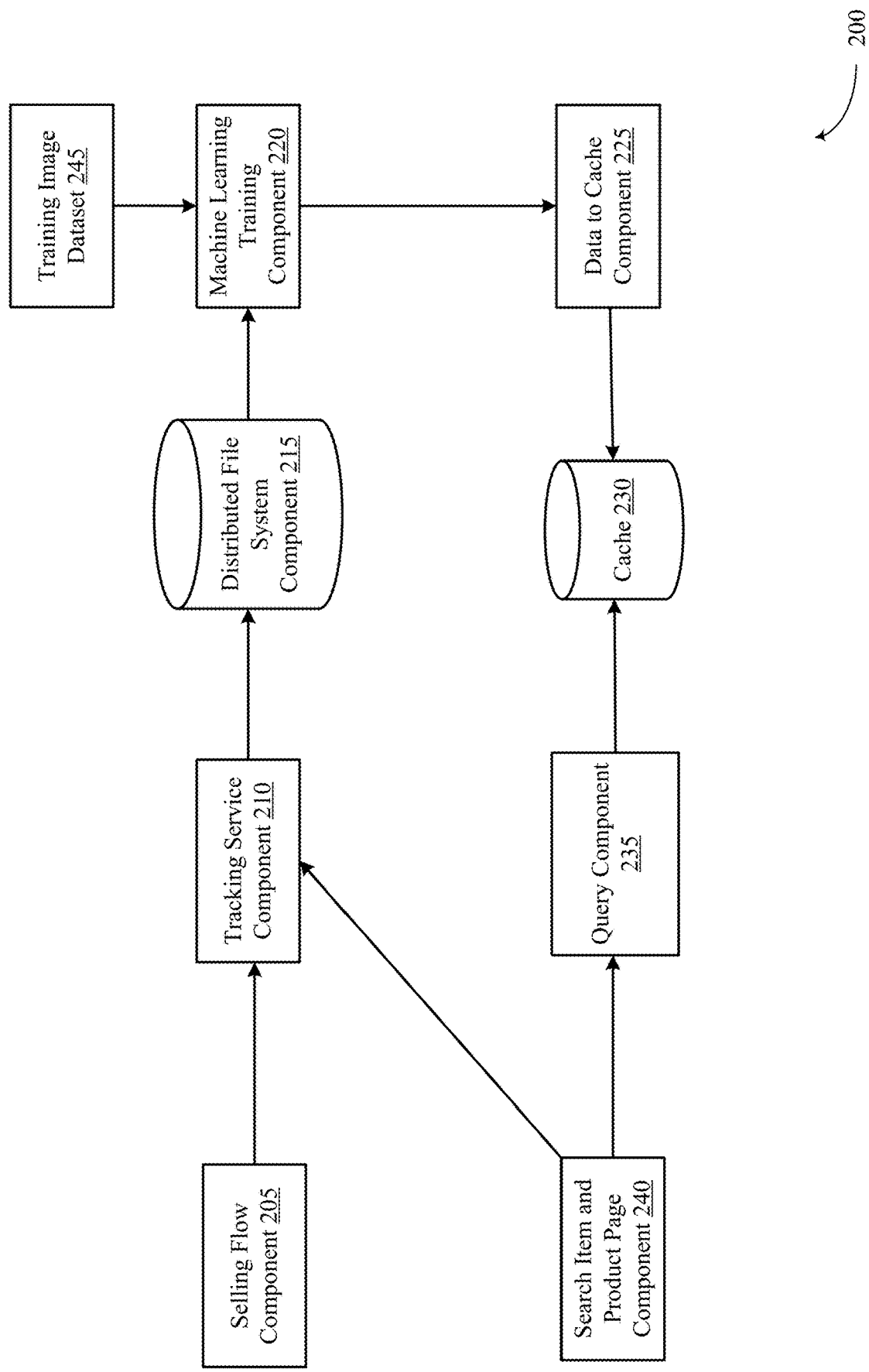
FIG. 2 illustrates an example of an application flow that supports face detection to address privacy in publishing image datasets in accordance with aspects of the present disclosure.

FIG. 2 illustrates an example of an application flow 200 that supports face detection to address privacy in publishing image datasets in accordance with aspects of the present disclosure. Components of the application flow 200 may include components of server system, such as server system 125 of the system 100, as described with reference to FIG. 1, or server system 125-b, as described with reference to FIG. 5, for implementing an online marketplace. Some components of application flow 200 may be within or communicating with a data center, such as data center 120, or a cloud platform, such as cloud platform 115, or both. Application flow 200 may represent a number of components used to perform face detection to address privacy, and ensure that listed images are public images.

Selling flow component 205 may interact with one or more users to generate listings from one or more users, or "sellers" that may intend to sell one or more items (e.g., products) via an online marketplace. The seller may be a user operating a user device, such as a user device 110 or a user device 505 as described with respect to FIGS. 1 and 5, respectively. The interaction with selling flow component 205 may prompt the seller to input a number of parameters describing the item to be listed for sale. In an example, the selling flow component 205 may cause the user device 110 to present a graphical user interface for generation of a listing. A seller may generate a listing of an item (e.g., product) for sale that includes a description of the product, and, in some cases, may upload to the selling flow component 205 one or more images of the item. The image of the item may be selected by the seller, and may include a private face or a non-private face. A non-private face may be a non-human face, a published human face, a public figure human face, a drawing of a human face (e.g., an animation or a logo) or any combination of these.

The selling flow component 205 may categorize the listing as for a particular product of a set of products available to purchase via the online marketplace. A listing may be mapped to a particular product where the items listed for sale have the same or similar characteristics, but may permit some variation to exist between the items while still being mapped to the same product. In some cases, the seller generating the listing may select or recommend that the listing is for a particular product. The user-recommended product for the listing may be updated or changed by the selling flow component 205 or a machine learning training component 220.

In some examples, the selling flow component 205 or the machine learning training component 220 may classify any faces in the images uploaded in the selling flow component as being a private human face or a non-private human face. In one example, the selling flow component 205 or the machine learning training component 220 may execute a machine learning algorithm (e.g., neural network algorithm) to classify any detected faces in the listing as being a private or non-private human face. An example of the machine learning algorithm used to classify the faces may be a neural network, such as a pointer generator network.

The machine learning algorithm may be trained using a training image dataset 245. The machine learning training component 220 may perform a two-stage face detection framework. Training image dataset 245 may be a pre-selected set of images chosen to be used by machine learning training component 220 to perform the face classification. Training image dataset 245 may include a number of images identified as private human faces (e.g., not safe to publish) or non-private human faces (e.g., safe to publish). For example, the dataset may include 69,313 images, of which 57,019 may be pre-identified as non-private human faces, and 12,294 may be pre-identified as private human faces. This image dataset may be an example of an eBayFace image dataset. In this case, a training image set having a disproportionate number of non-private faces relative to private faces is an example of an imbalance distribution. The images may be images from eBay-listed products, and may be from a multi-task cascaded convolutional neural network (MTCNN) detection bounding boxes. The non-private human faces may include fake faces, celebrity faces, faces on books, CD, DVD, or on any products. The private human faces may include a set of NSTS faces.

In a first stage, image dataset 245 may be selected and a training score is assigned to each image in the image dataset 245. The training image dataset 245 may be used in the first stage by the machine learning training component 220 to train a machine learning model to detect human faces within each image in the image dataset 245. The machine learning model may be a neural network, such as a convolutional neural network, or other type of machine learning model. In some cases, the convolutional neural network may be an example of a ResNet-20 neural network. The ResNet-20 neural network may be a 20 layer neural network, with an input of 32 by 32. The ResNet-20 neural network may provide a high speed in face detection, and thus may quickly perform the two-stage framework as described herein.

The machine learning training component 220 may apply the machine learning model to generate face detection bounding boxes that indicates a human face candidate within an image, and iteratively generate corresponding predicted scores for each human face candidate detected within each of the training images. The predicted score indicates a likelihood that a real human face is detected in the detection bounding box. For example, the machine learning training component 220 may assign a score of '0' to each training image that does not include any human faces, and a score of '1' to each training image that includes at least one human face. The predicted score may be used to classify each image as having at least one human face (i.e., a predicted score higher than 0.25 is non-publishable) or not having any human faces (i.e., a predicted score of 0.25 or less is publishable).

The machine learning training component 220 may also receive, as an input, an acceptable aggregate error rate for the first training stage. In the first stage, training of the machine learning model may involve the machine learning training component 220 iteratively generating the predicted scores for the training images attempting to achieve the acceptable aggregate error rate (e.g., minimize the aggregate error or until it satisfies a threshold) between the predicted scores and the training scores for the set of training images. Once the acceptable aggregate error rate has been achieved, the first training stage is complete. The output of the first training stage may be a set of images with human faces detected in the images.

In the second stage, machine learning training component 220 may train the machine learning model to identify whether the faces in the set of images with human faces output by the first stage are private or non-private human faces. In an example of the second stage, binary cross-entropy (BCE) may be used for classifying a face as private or non-private. BCE may defined by the following equation:

$$BCE = -1/N \sum_{i=1}^{N} [y_i \log(\hat{y}_i) + (1 - y_i)(\log(1 - \hat{y}_i)]$$

where $\hat{y}_t = \text{sigmoid}(\hat{x}_1)$ is the estimated probability of the face being a private human face. BCE may provide an indication of the accuracy of the machine learning model. The notation $\hat{y}_t \in \{0,1\}$ may denote as a ground-truth label. The ground truth label may indicate that every image of the selected dataset is pre-assigned with a 0 or a 1 through direct identification. The machine learning training component 220 may use BCE to assign a score to each human face candidate detected within each of the training images. For example, a score of '0' may be assigned to each training image that does not include any private human faces, and a score of '1' may be assigned to each training image that includes at least one private human face. The predicted score may be used to classify each image as having at least one human face (i.e., a predicted score higher than 0.25 is non-publishable) or not having any human faces (i.e., a predicted score of 0.25 or less is publishable). In some examples, the machine learning model may classify the images in the training image dataset 245 where the classifications have an unacceptably high false positive rate. A false positive may refer to images that are classified as including only non-human faces (e.g., animated faces or logos) when the image in fact includes at least one private human face, includes only non-private human faces when the image in fact includes one or more private human faces, includes one or more private human faces when image in fact does not include any private human faces, or the like.

To address the imbalance distribution issue caused by the ratio of private faces to non-private faces in the training image set, the machine learning training component 220 may introduce a distribution-balance function as part of a second stage of training. For example, a distribution-balance function may be a binary focal loss (BFL) function defined as:

$$BFL = -1/N \sum_{i=1}^{N} [\alpha(1-\hat{y}_i)^\gamma y_i \log(\hat{y}_i) + (1-\alpha)(\hat{y}_i)^\gamma (1-\hat{y}_i)(\log(1-\hat{y}_i)]$$

In other cases, the second stage of training may apply another distribution-balance function, such as a class-balanced loss function, or other type of imbalance correction function. The machine learning training component 220 may apply the distribution-balance function to generate a distribution-balance value for weighting the aggregate of the difference of the magnitude when an imbalance distribution in a training image set is observed. When the imbalance distribution does not satisfy a threshold (e.g., too high of a ratio of non-private human faces relative to private human faces in a training image set), the distribution-balance function may generate a distribution-balance value that increases the aggregate of the magnitude of the difference. When the imbalance distribution satisfies a threshold (e.g., an acceptable ratio between private human faces and non-private human faces in a training image set), the distribution-balance function may generate a distribution-balance value that does not change or may nominally change the aggregate of the magnitude of the difference. Once the machine learning model is able to achieve the acceptable aggregate magnitude difference rate across the second set of images, accounting for the distribution-balance value, the second training stage is complete indicating that the machine learning model has achieved a desired balance distribution between classifying human faces as private and non-private for the second set of images. As this point, the machine learning model may be considered a distribution-balance trained machine learning model.

In addition to using distribution-balance function at the second stage of the machine learning training, data augmentation may be added to improve classification performance. In some examples, different sets of images of training image dataset 245 may be split into different samples. Different training models may be applied to each set of samples to determine which sample set leads to better machine learning model classification performance. For example, a BFL with a $\alpha=0.25$ and a $\gamma=2.0$ with data augmentation may be used for the second stage of training the machine learning model. Another imbalance correction function with varying parameters may also be used to perform the data augmentation. After the model is trained, additional training may be performed to update and/or improve the accuracy of the face classification by the machine learning training component 220.

In some cases, human review of image classifications by the machine learning model may be used in the first stage, the second stage, or both, to assist with training of the machine learning model. In some cases, the predicted scores output by the machine learning training model may be near a face classification threshold (e.g., a threshold score of 0.25), meaning there may be some uncertainty by the machine learning model as to whether an image includes any private human faces. Classifications may be flagged where a predicted score is within a percentage or range of the face classification threshold (e.g., images having scores within +/−10% of the face classification threshold are flagged). These scores may be flagged for human review, at which point a human may assign a corrected score to the flagged image, identifying whether the face is a private or non-private human face (where non-private human face classification may also include non-human faces or previously assigned false-positives). The images and corrected scores may be fed back into the machine learning model 220 as an additional set of training image datasets 245, or as an updated training image dataset 245, for subsequent training of the machine learning model.

After the second stage of training is complete, the machine learning model may be used to classify an image (i.e., a non-training image) as having at least one private human face (i.e., is non-publishable) or not having any private human faces (i.e., is publishable). For example, the distribution-balance trained machine learning model may be used to process a set of images to identify which images are publishable, and which are not. In some cases, the distribution-balance trained machine learning model may be applied to images associated with uploaded product listings of an online auction marketplace.

For example, up to each listing uploaded by one or more sellers may be tracked by a tracking service component 210. The tracking service component 210 may forward the listing and corresponding image for storage in a distributed file system component 215. Tracking service component 210 may monitor buyer behavior when viewing one or more listings in a search results pages. Examples of search results pages including listings that may be monitored are also discussed with reference to FIG. 4. Tracking service component 210 may monitor a listing presented in a search results page for purchases, as well as monitor user interaction with the product listing and communicate user behavior data to the distributed file system component 215. Distributed file system component 215 may be an example of a HADOOP application. Distributed file system component 215 may use a network of multiple computers to analyze large amounts of data. Distributed file system component 215 may monitor and analyze sales throughout the online application as well as analyze sales based on user behavior data as detected by tracking service component 210. The machine learning training component 220 may continually classify images received from selling flow component 205.

Once the image from the listing is classified, the machine learning training component 220 may forward the classified image with an indication of the classification (e.g., containing a private human face or non-private human face) and an identification of its product to a data to cache component 225 using a workflow management platform (e.g., Apache Airflow). The data to cache component 225 may be an example of a cache layer, such as a memory cache (e.g., memcache) or a non-structed query language (non-SQL or NOSQL) database.

The data to cache component 225 may provide the listing and the status of the image classification of images contained in the listing for storage in cache 230. In some cases, the image and listing may be stored in cache 230, along with an indication of whether the image is a private face or a non-private face. In other cases, the image may be classified as a private face, and the image may not be stored in the cache 230, as the image is a private face, and may not be displayed to a user in response to a search query.

When a buyer user device (e.g., user device 110) uses an online application (e.g., in an online marketplace) to transmit a search query for an item listed for sale in the online marketplace, a query component 235 may implement a service (e.g., representational state transfer (REST) service) to respond to the query. The query component 235 may query the cache 230 using the search query to identify a particular product of a set of available products and one or more listings that match the search query. In some cases, the cache 230 may return product listings, along with images, that match the search query.

The search query results, including listings and images returned by cache 230, may be displayed by search item and product page component 240. The cache 230 may return listings with images if the image is classified as non-private by machine learning training component 220. For listings that contain images classified as private human faces, the cache 230 may return the listing with a blurred image, or the listing with no image. This may be based on whether data to cache component 225 stored the images classified as private human face images, or blurred the images classified as private human face images. Thus, based on the classification performed by the model trained by the training image dataset 245 and machine learning training component 220, only faces that are classified as public faces or non-human faces may be displayed with listings on search item and product page component. Thus, privacy concerns may be avoided, as private human faces may not be displayed publicly on the auction service.

As the prospective buyer interacts with the search results page as part of the search item and product page component 240, the tracking service component 210 may coordinate with the search item and product page component 240 to monitor the behavior of the prospective buyer to update the one or more user behavior data stored in the distributed file system component 215. Tracking serve component 210 may aid in facilitating a purchase of a product by a user operating a user device 110 that entered the search query into query component 235.

Figure 3:
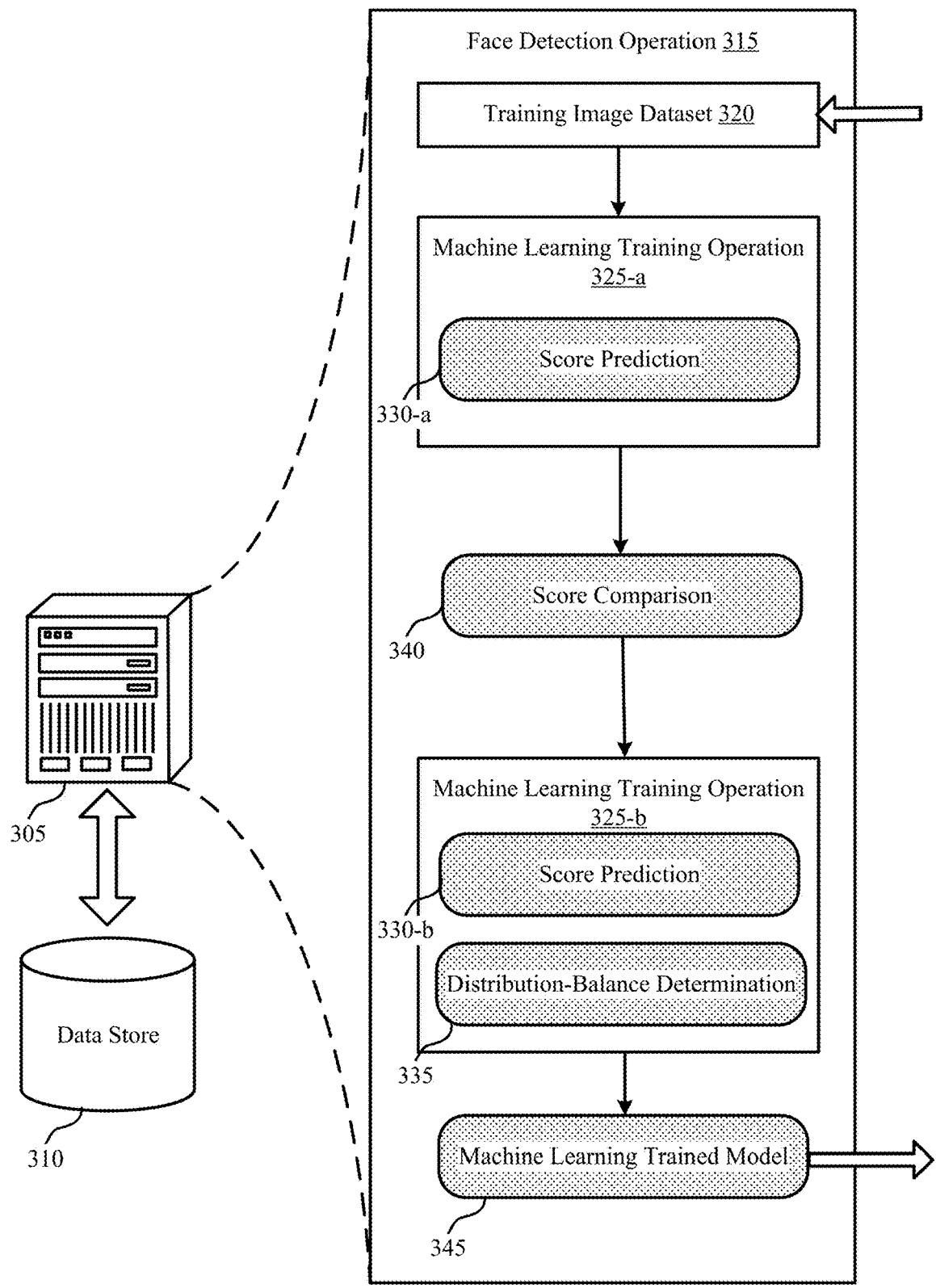
FIG. 3 illustrates an example of a system that supports face detection to address privacy in publishing image datasets in accordance with aspects of the present disclosure.

FIG. 3 illustrates an example of a system 300 that supports face detection to address privacy in publishing image datasets in accordance with aspects of the present disclosure. The system 300 may include a device 305 (e.g., an application server or server system) and a data store 310.

In some cases, the functions performed by the device 305 (such as application server) may instead be performed by a component of the data store 365. A user device (not shown) may support an application for online marketplace. Specifically, a user device in combination with the device 305 may support an online marketplace that classifies images in listing as containing private human faces or non-private faces (e.g., non-private human faces). An application (or an application hosting the online marketplace) may train a machine learning model at the device 305, where the device 305 may train a machine learning trained model 345 based on training image dataset 320 to classify images in listing as private human faces or non-private faces.

According to one or more aspects of the present disclosure, a user device may be used by a potential buyer to provide a search query and receive one or more search results. Specifically, the user device may display an interactive interface for displaying an online marketplace and displaying one or more search results. In one example, the user device may be used by a seller to upload a listing. The seller may upload a listing including an image of the product in the listing. The image may include a human face, which may be a private or non-private human face. In some cases, the interface at the user device may run as a webpage within a web browser (e.g., as a software as a service (SaaS) product). In other cases, the interface may be part of an application downloaded onto the user device. A user (seller and/or buyer) operating the user device may input information into the user interface to log on to the online marketplace. In some cases, a user may be associated with a user credential or user ID, and the user may log on to the online marketplace using the user credential.

In some cases, the device 305 may train or develop a mathematical model (e.g., artificial intelligence model, a machine learning model, a neural network model etc.) to classify images in the uploaded listings. In certain aspects, the device 305 (or application server) may receive a request to develop an artificial intelligence model to classify images. Additionally or alternatively, the device 305 may develop an artificial intelligence model (e.g., machine learning model) for classifying seller uploaded images as private or non-private faces. As described herein, the device 305 in conjunction with the data store 310 may perform the face detection operation 315.

According to one or more aspects of the present disclosure, the face detection operation 315 may be performed by the device 305, such as a server (e.g., an application server, a database server, a server cluster, a virtual machine, a container, etc.). Although not shown in FIG. 3, the face detection operation 315 may be performed by a user device, a data store, or some combination of these or similar devices. In some cases, the device 305 may be a component of a subsystem 125 as described with reference to FIG. 1. The device 305 may support computer aided data science, which may be performed by an artificial intelligence-enhanced data analytics framework. The device 305 may be an example of a general analysis machine and, as such, may perform data analytics and classify images in listings based on receiving a product description from a user (e.g., seller).

According to one or more aspects of the present disclosure, the device 305 may receive training image dataset 320. As described herein, the training image dataset 320 be a set of images preselected to perform machine learning training operation to train the machine learning model. For instance, the training data may be an eBayFace image dataset, where each image is assigned a score based on whether the image includes at least one private human face or does not include any private human faces.

After receiving the training image dataset 320, the device 305 may perform a machine learning training operation 325-a. The machine learning training operation 325-a may perform a score prediction 330, which may output a score indicating whether each image of the training image dataset 320 contains a private face or a non-private face. For example, a score of 1 may indicate a private face, and a score of zero may indicate a non-private face, or vice-versa. Score prediction 330 may output a set of scores, which may be compared by score comparison 340 to a training score corresponding to the training image dataset 320. Based on the set of scores, in some cases some images may be flagged for human correction. An image may be flagged for human correction if the score is near a threshold score of ambiguity (e.g., within 10% of a score of 0.5, or another percentage). The images flagged may be scored by a human user, and input into the training image dataset 320 or a subsequent training image dataset 320 to update the machine learning model.

Based on the difference between the predicted score and the training score, face detection operation 315 may rerun machine learning training operation 325-b, predict scores using score prediction 330-b, and then apply a distribution-balance calculation determination algorithm 335 to account for the difference in scores identified at score comparison 340. The distribution-balance calculation determination algorithm 335 may be a BFL, class-balanced, or another type of distribution-balance model. The results of face detection operation 315 may result in machine learning trained model 345. Machine learning trained model 345 may be used to classify other image sets.

Thus, face detection operation 315 may training a machine learning trained model 345 to efficiently detect and identify private and non-private faces of an image set. This machine learning trained model 345 may be applied to images uploaded by sellers as a part of a product listing, as described with respect to FIG. 5.

Figure 4:
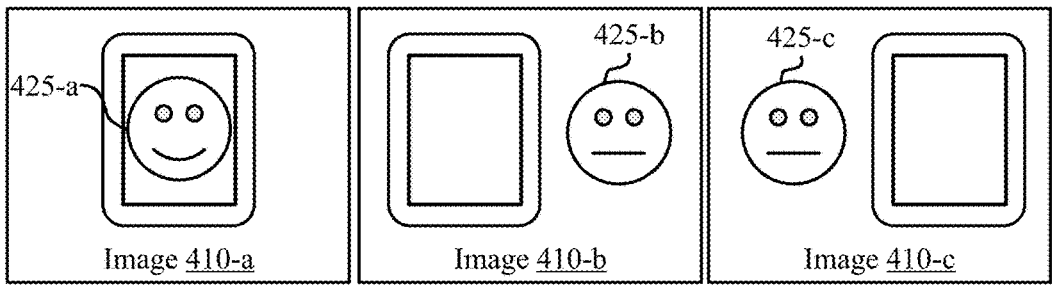
FIG. 4 illustrates an example of a webpage that supports face detection to address privacy in publishing image datasets in accordance with aspects of the present disclosure.

FIG. 4 illustrates an example of a search results webpage 400 that supports face detection to address privacy in publishing image datasets in accordance with aspects of the present disclosure. Webpage 400 may be an example of a page displaying search results based on a buyer-inputted search query. Webpage 400 may be displayed to a prospective buyer at a user device (e.g., user device 110) at a tablet, smartphone, or another client-facing user device.

A seller may upload a product listing, and the listing may include one or more images 410 of the product. For example, the seller may upload a product listing of an Apple iPhone along with one of images 410-a, 410-b, or 410-c. One seller may upload a product listing with image 410-a, one seller may upload a product listing with image 410-b, and one seller may upload a third product listing with image 410-c. Prior to publishing images 410 with the product listing, the online auction marketplace displaying the listings may apply a distribution-balance (e.g., BFL, class-balanced, or another type of distribution-balance model) trained machine learning model to image set 401 to classify any faces in images 410 as a private human face or a non-private human face. The distribution-balance machine trained model may identify the faces 425 (e.g., faces 425-a, 425-b, 425-c) as human face candidates in each image 410, and then classify each detected face as private or non-private. Thus, private human faces may be identified, and may be blurred, obscured, or removed from the product listing. For example, image 410-a may be classified as a non-private (e.g., publishable human face), and images 410-b and 410-c may be classified as a private (e.g., non-publishable human face).

A potential buyer may access an online application (e.g., a website or a smart-phone app) of an online marketplace (e.g., presented by search item and product page component 240) and input a search query. In an example, the buyer may enter a search for purchasing a phone. In an example, a buyer may input "Apple iPhone" as a search query. The search query may result in the display at the buyer user device of a search result 405 that includes one or more listings 415. The one or more listings 415 may include images that have been classified as containing non-private faces, or images that have been blurred to obscure private human faces, or both.

As depicted in the FIG. 4, each listing may include an image 420 associated with the listing. Search result 405 may include one or more listings generated by sellers (e.g., users utilizing a user device 110 to interact with a selling flow component 205) that relate to the search query input by the buyer. For example, each listing 415 may be an Apple iPhone. Listing 415-a may include originally uploaded image 420-a (which may be image 410-a, as the distribution-balance trained) machine learning model classified image 410-a as containing a non-private human face. Listing 415-b may include an altered (e.g., blurred) image 420-b (which may be based on image 410-b). Image 410-b may include a blurred version of face 425-b from image 410-b, as image 410-b may be classified as including private human face 425-b. Further, the distribution-balance trained machine learning model may classify image 410-c as containing a private human face 425-c. In some cases, images with private human faces may be removed, rather than blurred or obscured. As such, listing 415-c, which was uploaded with image 410-c, may include a blank image 420-c, as the image 410-c was classified as containing private human face 425-c.

Therefore, the distribution-balance trained machine learning model may classify images as containing private or non-private faces. A server of an online marketplace may determine whether to blur or remove private faces from images sets 401, and display images including non-private (e.g., publishable faces), and thus avoid any privacy concerns, and protect the privacy of persons having private human faces that may be accidentally uploaded, or uploaded without permission from the individual.

Figure 5:
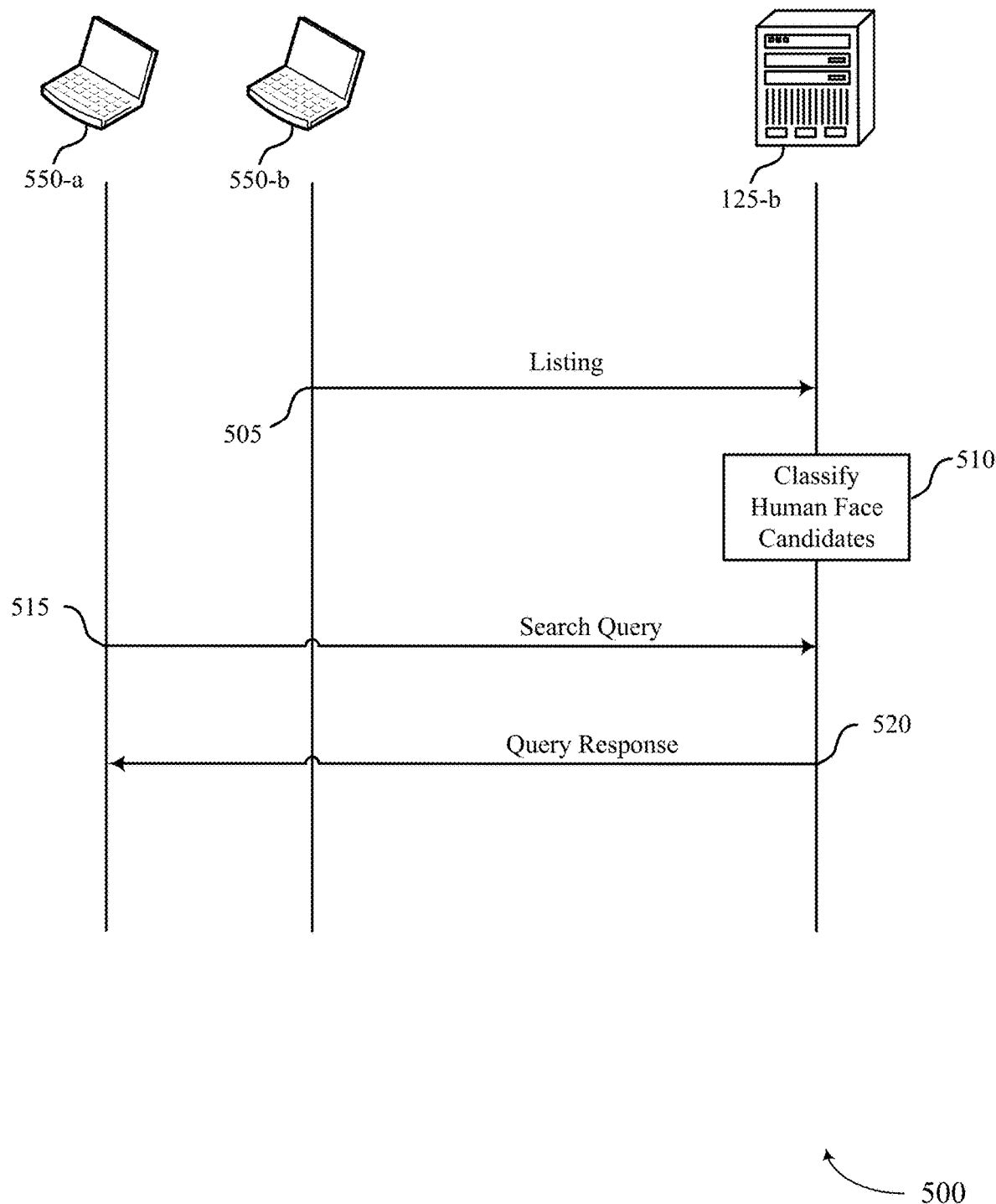
FIG. 5 illustrates an example of a process flow that supports face detection to address privacy in publishing image datasets in accordance with aspects of the present disclosure.

FIG. 5 illustrates an example of a process flow 500 that supports face detection to address privacy in publishing image datasets in accordance with aspects of the present disclosure. Process flow 500 may include a server system 125-b, a buyer user device 550-a, and a seller user device 550-b. Server system 125-b may be an example of server system 125 as described with reference to FIG. 1. Buyer user device 550-a and seller user device 550-b may be example of a user device 110 as described with reference to FIG. 1. Seller user device 550-b may be a device that a seller uses to generate a listing for an item for sale via an online marketplace, and may have the option to upload description of the item when creating the listing. Buyer user device 550-a may be a device that a prospective buyer may use to access the online marketplace, such as via a smart-phone app or a website, to search for items listed for sale and to complete purchase transactions.

At 505, server system 125-b may receive a listing comprising at least one image for the online marketplace. Server system 125-b may receive the listing from user device 550-b. At 510, server system 125-b may classify, by at least one processor that implements a distribution-balance trained machine learning model, each human face candidate within the at least one image as being one of a private human face or a non-private human face. The non-private human face may include a non-human face, a published human face, a public figure human face, a drawing of a human face, or a combination of these.

Server system 125-*b* may train the distribution-balance trained machine learning model. Server system 125-*b* may apply a machine learning model to a set of training images to generate a set of predicted scores for the set of training images. Server system 125-*b* may determine a distribution-balance value corresponding to the set of training images. The distribution-balance value may be a weighting that is a function of a ratio of private to non-private human faces in the set of training images. The distribution-balance value may be a weight value applied to a difference between a predicted score and a training score for one or more training images of the set of training images to adjust the identified error when an imbalance distribution of the training image set does not satisfy a threshold (e.g., a disproportionate number of non-private to private faces in the training image set). The distribution-balance value may increase as the number of non-public faces increase relative to the number of private human faces in a training data set, and may decrease as the number of non-public faces approaches the number of private human faces in a training data set. The distribution-balance value may be used to adjust the aggregate error determined by the machine learning model at a particular training iteration.

Each training image of the set of training images may be assigned a training score of the set of training scores to indicate that the respective training image includes at least one private human face or at least one non-private human face without any private human faces. Server system 125-*b* may determine the distribution-balance value based on a ratio of private to non-private human faces in the set of training images. Server system 125-*b* may then train the machine learning model to generate the distribution-balance trained machine learning model based on the determined distribution-balance value.

Server system 125-*b* may train the machine learned model based on the determined distribution-balance value, to generate an updated machine learning model. Server system 125-*b* may apply the updated machine learning model to the set of training images to generate a second set of predicted scores for the set of training images. Server system 125-*b* may determine a second distribution-balance value based on the second set of predicted scores and the set of training scores. Server system 125-*b* may train the updated machine learning model based on the second distribution-balance value.

At 515, server system 125-*b* may receive, from user device 550-*a*, a search query that is mapped to the listing in the online marketplace. At 520, server system 125-*b* may transmit, to user device 550-*a*, a query response including the listing that includes a first image of the at least one image determined to not include any private human faces or obscures any private human faces within the first image based on the classifying.

In some cases, server system 125-*b* may receive the search query mapped to the listing that includes the first image. In these cases, server system 125-*b* may transmit the query response including the listing and the first image, based on each human face candidate within the first image being classified as a non-private human face.

In some cases, server system 125-*b* may receive the search query mapped to the listing that includes a second image of the at least one first image. In these cases, server system 125-*b* may transmit the query response including the listing without the second image based on the least one human face candidate within the second image being classified as a private human face.

In some cases, server system 125-*b* may output a set of one or more images of the at least one image, or an indication of the one or more images in the set, that each include at least one private human face based on the classifying.

In other cases, server system 125-*b* may output a set of one or more images of the at least one image, or an indication of the one or more images in the set, determined to not include any private human faces based on the classifying.

Figure 6:
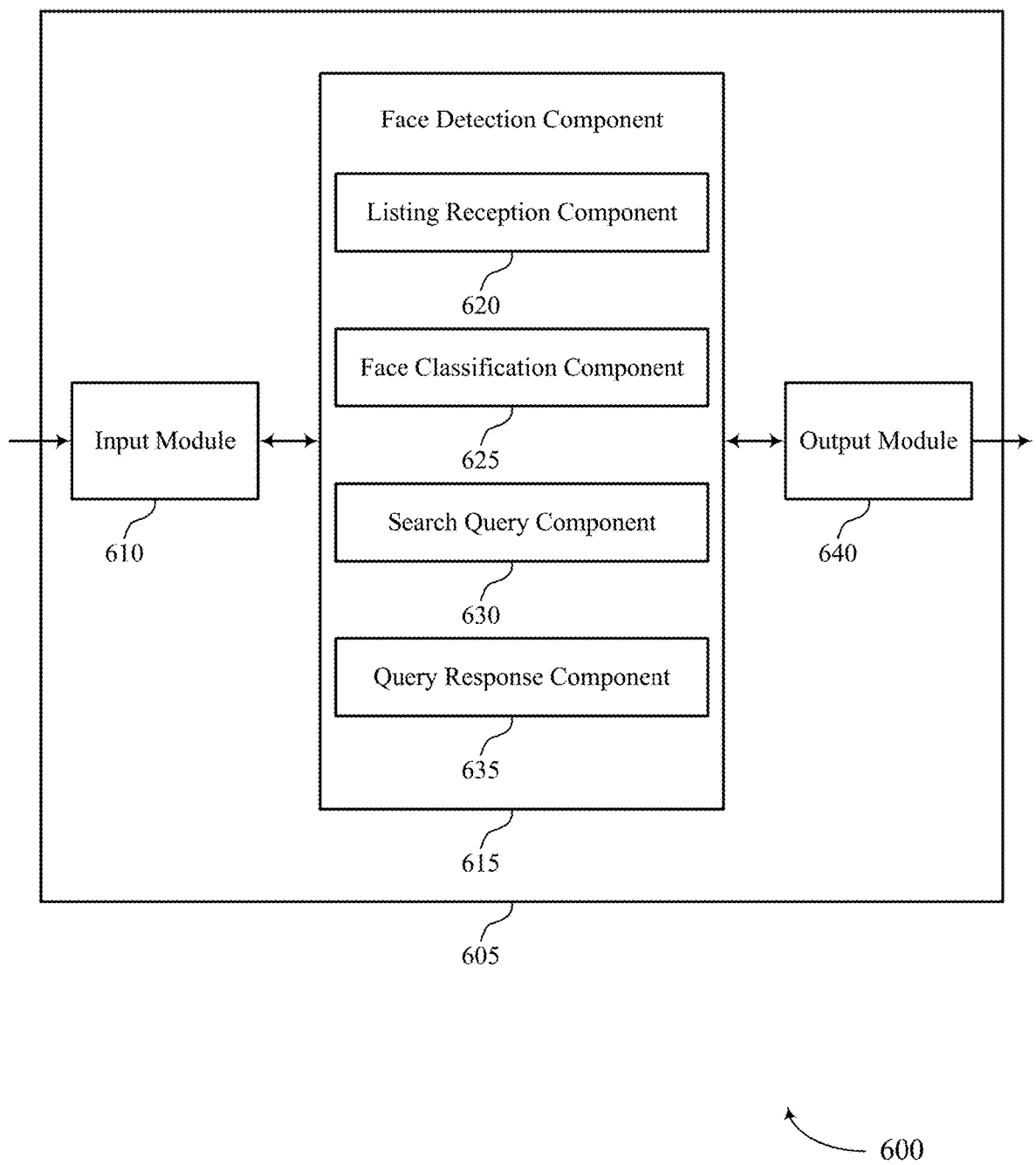
FIG. 6 shows a block diagram of an apparatus that supports face detection to address privacy in publishing image datasets in accordance with aspects of the present disclosure.

FIG. 6 shows a block diagram 600 of an apparatus 605 that supports face detection to address privacy in publishing image datasets in accordance with aspects of the present disclosure. The apparatus 605 may include an input module 610, a face detection component 615, and an output module 640. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the face detection component 615 to support face detection to address privacy in publishing image datasets. In some cases, the input module 610 may be a component of an input/output (I/O) controller 815 as described with reference to FIG. 8.

The face detection component 615 may include a listing reception component 620, a face classification component 625, a search query component 630, and a query response component 635. The face detection component 615 may be an example of aspects of the face detection component 705 or 810 described with reference to FIGS. 7 and 8.

The face detection component 615 and/or at least some of its various sub-components may be implemented in hardware, software executed by a processor, firmware, or any combination thereof. If implemented in software executed by a processor, the functions of the face detection component 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The face detection component 615 and/or at least some of its various sub-components may be physically located at various positions, including being distributed such that portions of functions are implemented at different physical locations by one or more physical devices. In some examples, the face detection component 615 and/or at least some of its various sub-components may be a separate and distinct component in accordance with various aspects of the present disclosure. In other examples, the face detection component 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The listing reception component 620 may receive a listing including at least one image for the online marketplace. The face classification component 625 may classify, by at least one processor that implements a distribution-balance trained machine learning model, each human face candidate within the at least one image as being one of a private human face or a non-private human face. The search query component 630 may receive, from a user device, a search query that is mapped to the listing in the online marketplace. The query response component 635 may transmit, to the user device, a query response including the listing that includes a first image of the at least one image determined to not include any private human faces or obscures any private human faces within the first image based on the classifying.

The output module 640 may manage output signals for the apparatus 605. For example, the output module 640 may receive signals from other components of the apparatus 605, such as the face detection component 615, and may transmit these signals to other components or devices. In some specific examples, the output module 640 may transmit output signals for display in a user interface, for storage in a database or data store, for further processing at a server or server cluster, or for any other processes at any number of devices or systems. In some cases, the output module 640 may be a component of an I/O controller 815 as described with reference to FIG. 8.

Figure 7:
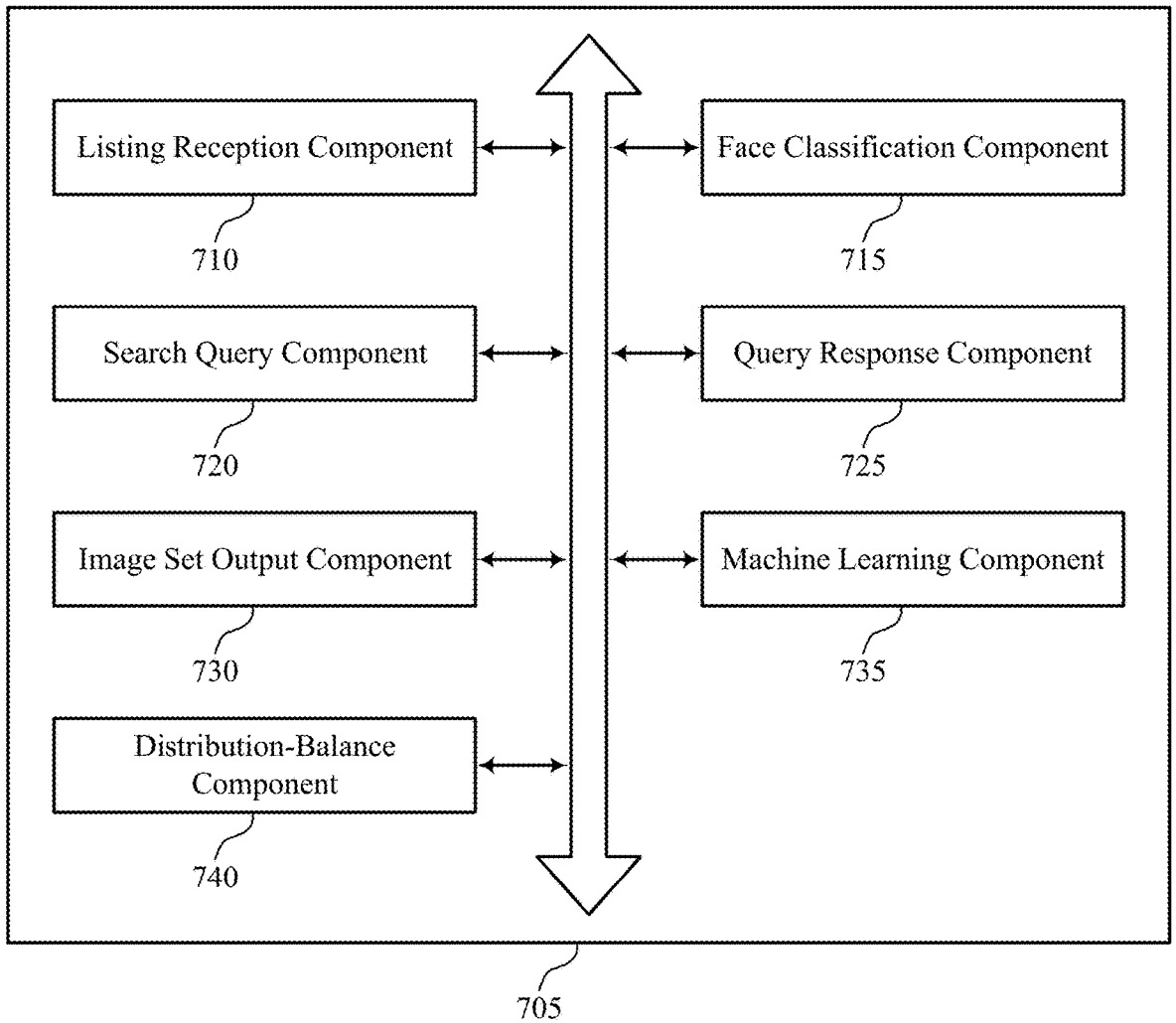
FIG. 7 shows a block diagram of a face detection component that supports face detection to address privacy in publishing image datasets in accordance with aspects of the present disclosure.

FIG. 7 shows a block diagram 700 of a face detection component 705 that supports face detection to address privacy in publishing image datasets in accordance with aspects of the present disclosure. The face detection component 705 may be an example of aspects of a face detection component 615 or a face detection component 810 described herein. The face detection component 705 may include a listing reception component 710, a face classification component 715, a search query component 720, a query response component 725, an image set output component 730, a machine learning component 735, and a distribution-balance component 740. Each of these modules may communicate, directly or indirectly, with one another (e.g., via one or more buses).

The listing reception component 710 may receive a listing including at least one image for the online marketplace. The face classification component 715 may classify, by at least one processor that implements a distribution-balance trained machine learning model, each human face candidate within the at least one image as being one of a private human face or a non-private human face. In some cases, the non-private human face includes a non-human face, a published human face, a public figure human face, a drawing of a human face, or any combination thereof.

The search query component 720 may receive, from a user device, a search query that is mapped to the listing in the online marketplace. In some examples, receiving the search query that is mapped to a listing that includes the first image. In some examples, receiving the search query that is mapped to a listing that includes a second image of the at least one first image.

The query response component 725 may transmit, to the user device, a query response including the listing that includes a first image of the at least one image determined to not include any private human faces or obscures any private human faces within the first image based on the classifying. In some examples, the query response component 725 may transmit, based on the search query, the query response including the listing and the first image based on each human face candidate within the first image being classified as a non-private human face. In some examples, the query response component 725 may transmit, based on the search query, the query response including the listing without the second image based on at least one human face candidate within the second image being classified as a private human face.

The image set output component 730 may output a set of one or more images of the at least one image, or an indication of the one or more images in the set, that each include at least one private human face based on the classifying. In some examples, the image set output component 730 may output a set of one or more images of the at least one image, or an indication of the one or more images in the set, determined to not include any private human faces based on the classifying.

The machine learning component 735 may apply a machine learning model to a set of training images to generate a set of predicted scores for the set of training images. In some examples, the machine learning component 735 may train the machine learning model to generate the distribution-balance trained machine learning model based on the determined distribution-balance value. In some examples, the machine learning component 735 may train the machine learning model, based on the determined distribution-balance value, to generate an updated machine learning model. In some examples, the machine learning component 735 may apply the updated machine learning model to the set of training images to generate a second set of predicted scores for the set of training images. In some examples, the machine learning component 735 may train the machine learning model to generate the distribution-balance trained machine learning model based on the distribution-balance value. In some cases, each training image of the set of training images is assigned a training score of the set of training scores to indicate that the respective training image includes at least one private human face or at least one non-private human face without any private human faces.

The distribution-balance component 740 may determine a distribution-balance value based on the set of training images. In some examples, the distribution-balance component 740 may determine the distribution-balance value based on a ratio of private to non-private human faces in the set of training images. In some examples, the distribution-balance component 740 may determine an aggregate error value based on the second set of predicted scores and the set of training scores.

In some examples, the machine learning component 735 may train the updated machine learning model to generate the distribution-balance trained machine learning model based on the aggregate error value. In some cases, each training image of the set of training images is assigned a training score of the set of training scores to indicate that the respective training image includes at least one private human face or at least one non-private human face without any private human faces.

Figure 8:
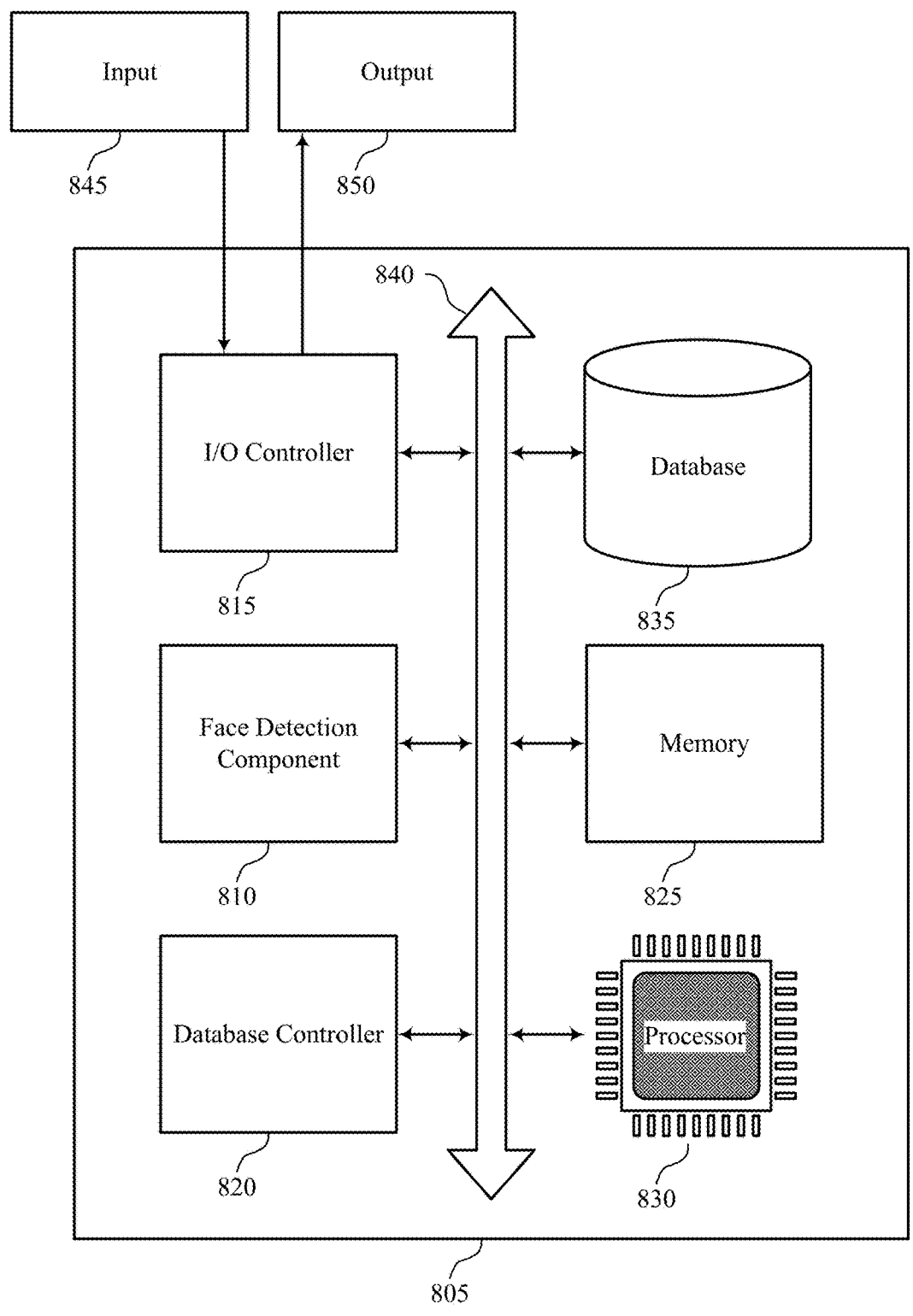
FIG. 8 shows a diagram of a system including a device that supports face detection to address privacy in publishing image datasets in accordance with aspects of the present disclosure.

FIG. 8 shows a diagram of a system 800 including a device 805 that supports face detection to address privacy in publishing image datasets in accordance with aspects of the present disclosure. The device 805 may be an example of or include the components of a database server or an apparatus 605 as described herein. The device 805 may include components for bi-directional data communications including components for transmitting and receiving communications, including a face detection component 810, an I/O controller 815, a database controller 820, memory 825, a processor 830, and a database 835. These components may be in electronic communication via one or more buses (e.g., bus 840).

The face detection component 810 may be an example of a face detection component 615 or 705 as described herein. For example, the face detection component 810 may perform any of the methods or processes described above with reference to FIGS. 6 and 7. In some cases, the face detection component 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting face detection to address privacy in publishing image datasets).

Figure 9:
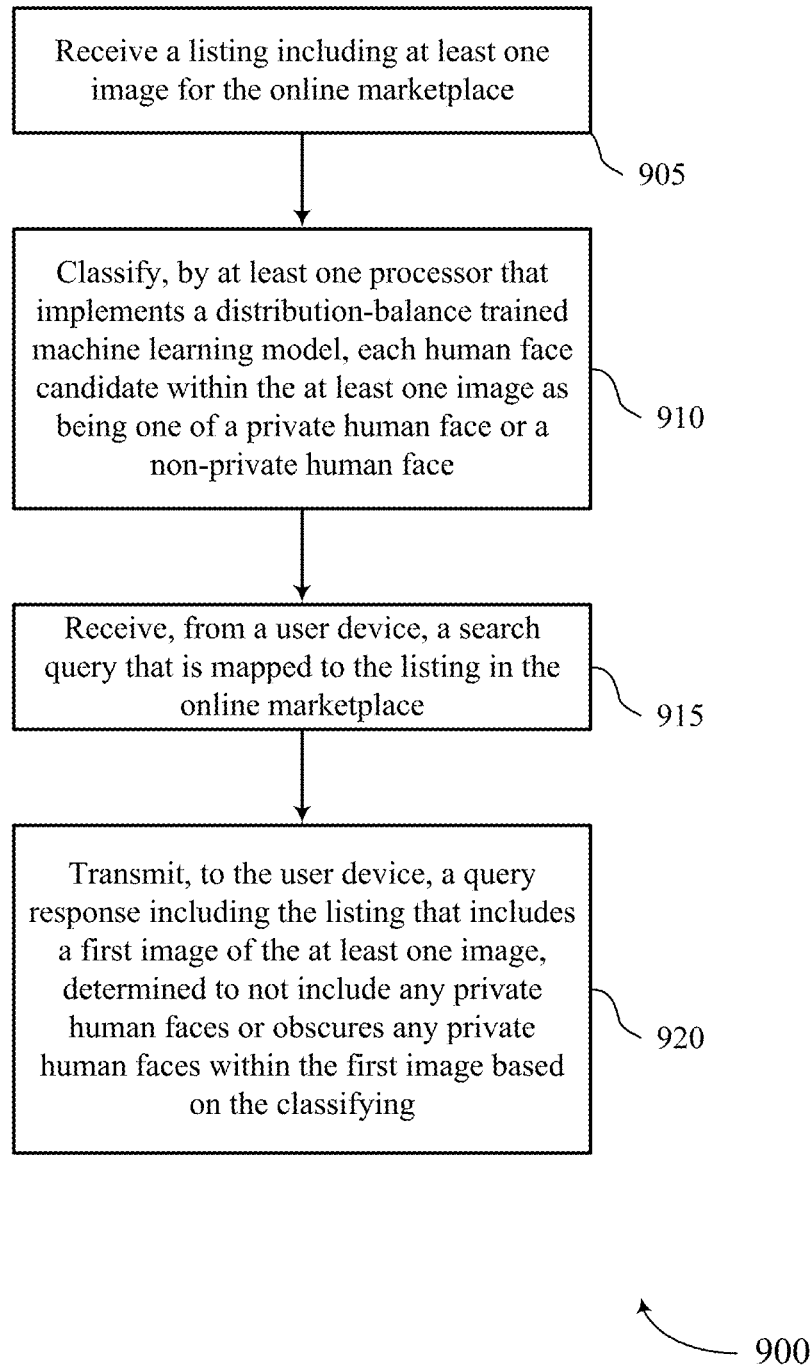
FIGS. 9 through 11 show flowcharts illustrating methods that support face detection to address privacy in publishing image datasets in accordance with aspects of the present disclosure.

FIG. 9 shows a flowchart illustrating a method 900 that supports face detection to address privacy in publishing image datasets in accordance with aspects of the present disclosure. The operations of method 900 may be implemented by a database server or its components as described herein. For example, the operations of method 900 may be performed by a face detection component as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 905, the database server may receive a listing including at least one image for the online marketplace. The operations of 905 may be performed according to the methods described herein. In some examples, aspects of the operations of 905 may be performed by a listing reception component as described with reference to FIGS. 6 through 8.

At 910, the database server may classify, by at least one processor that implements a distribution-balance trained machine learning model, each human face candidate within the at least one image as being one of a private human face or a non-private human face. The operations of 910 may be performed according to the methods described herein. In some examples, aspects of the operations of 910 may be performed by a face classification component as described with reference to FIGS. 6 through 8.

At 915, the database server may receive, from a user device, a search query that is mapped to the listing in the online marketplace. The operations of 915 may be performed according to the methods described herein. In some examples, aspects of the operations of 915 may be performed by a search query component as described with reference to FIGS. 6 through 8.

At 920, the database server may transmit, to the user device, a query response including the listing that includes a first image of the at least one image determined to not include any private human faces or obscures any private human faces within the first image based on the classifying. The operations of 920 may be performed according to the methods described herein. In some examples, aspects of the operations of 920 may be performed by a query response component as described with reference to FIGS. 6 through 8.

Figure 10:
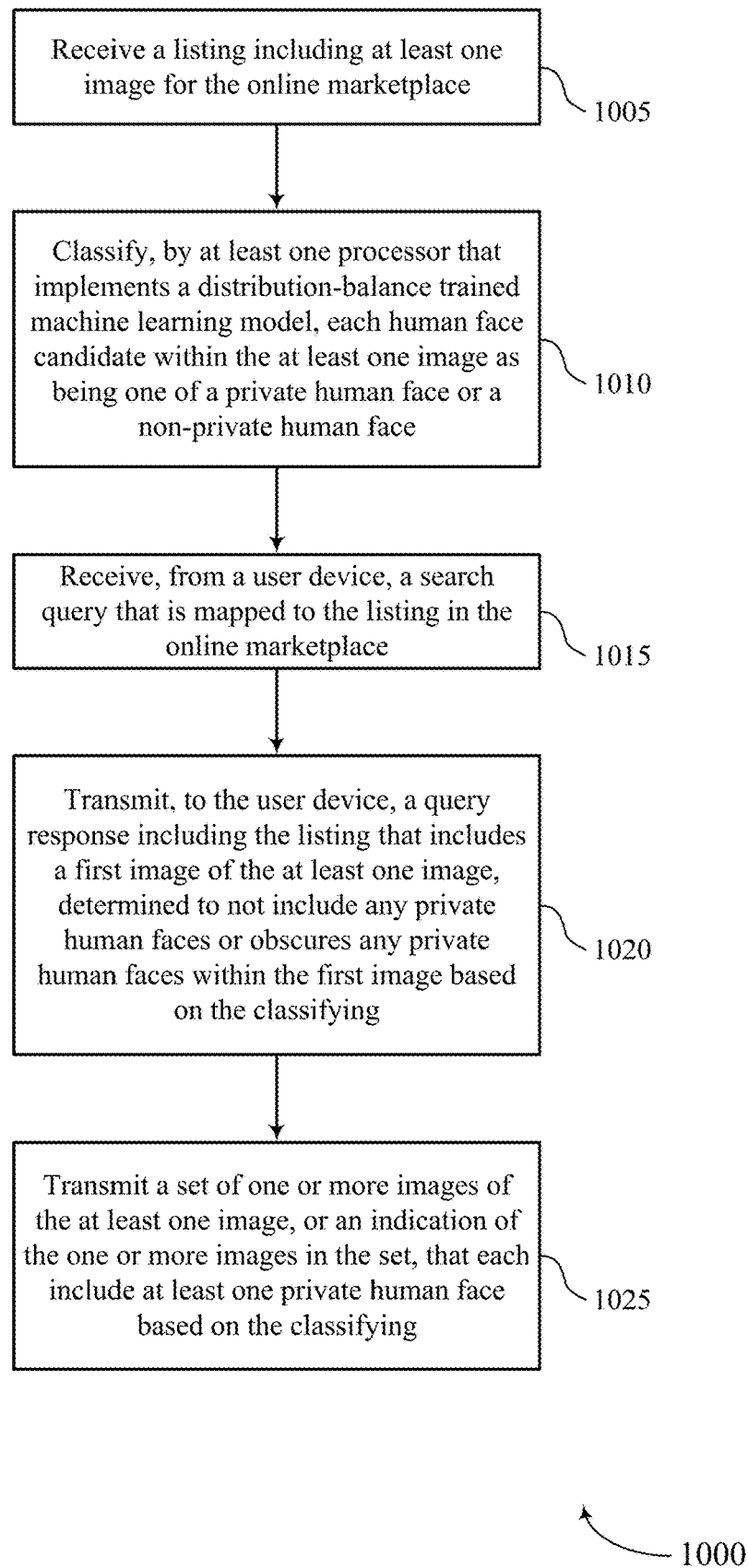

FIG. 10 shows a flowchart illustrating a method 1000 that supports face detection to address privacy in publishing image datasets in accordance with aspects of the present disclosure. The operations of method 1000 may be implemented by a database server or its components as described herein. For example, the operations of method 1000 may be performed by a face detection component as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1005, the database server may receive a listing including at least one image for the online marketplace. The operations of 1005 may be performed according to the methods described herein. In some examples, aspects of the operations of 1005 may be performed by a listing reception component as described with reference to FIGS. 6 through 8.

At 1010, the database server may classify, by at least one processor that implements a distribution-balance trained machine learning model, each human face candidate within the at least one image as being one of a private human face or a non-private human face. The operations of 1010 may be performed according to the methods described herein. In some examples, aspects of the operations of 1010 may be performed by a face classification component as described with reference to FIGS. 6 through 8.

At 1015, the database server may receive, from a user device, a search query that is mapped to the listing in the online marketplace. The operations of 1015 may be performed according to the methods described herein. In some examples, aspects of the operations of 1015 may be performed by a search query component as described with reference to FIGS. 6 through 8.

At 1020, the database server may transmit, to the user device, a query response including the listing that includes a first image of the at least one image determined to not include any private human faces or obscures any private human faces within the first image based on the classifying. The operations of 1020 may be performed according to the methods described herein. In some examples, aspects of the operations of 1020 may be performed by a query response component as described with reference to FIGS. 6 through 8.

At 1025, the database server may output a set of one or more images of the at least one image, or an indication of the one or more images in the set, that each include at least one private human face based on the classifying. The operations of 1025 may be performed according to the methods described herein. In some examples, aspects of the operations of 1025 may be performed by an image set output component as described with reference to FIGS. 6 through 8.

Figure 11:
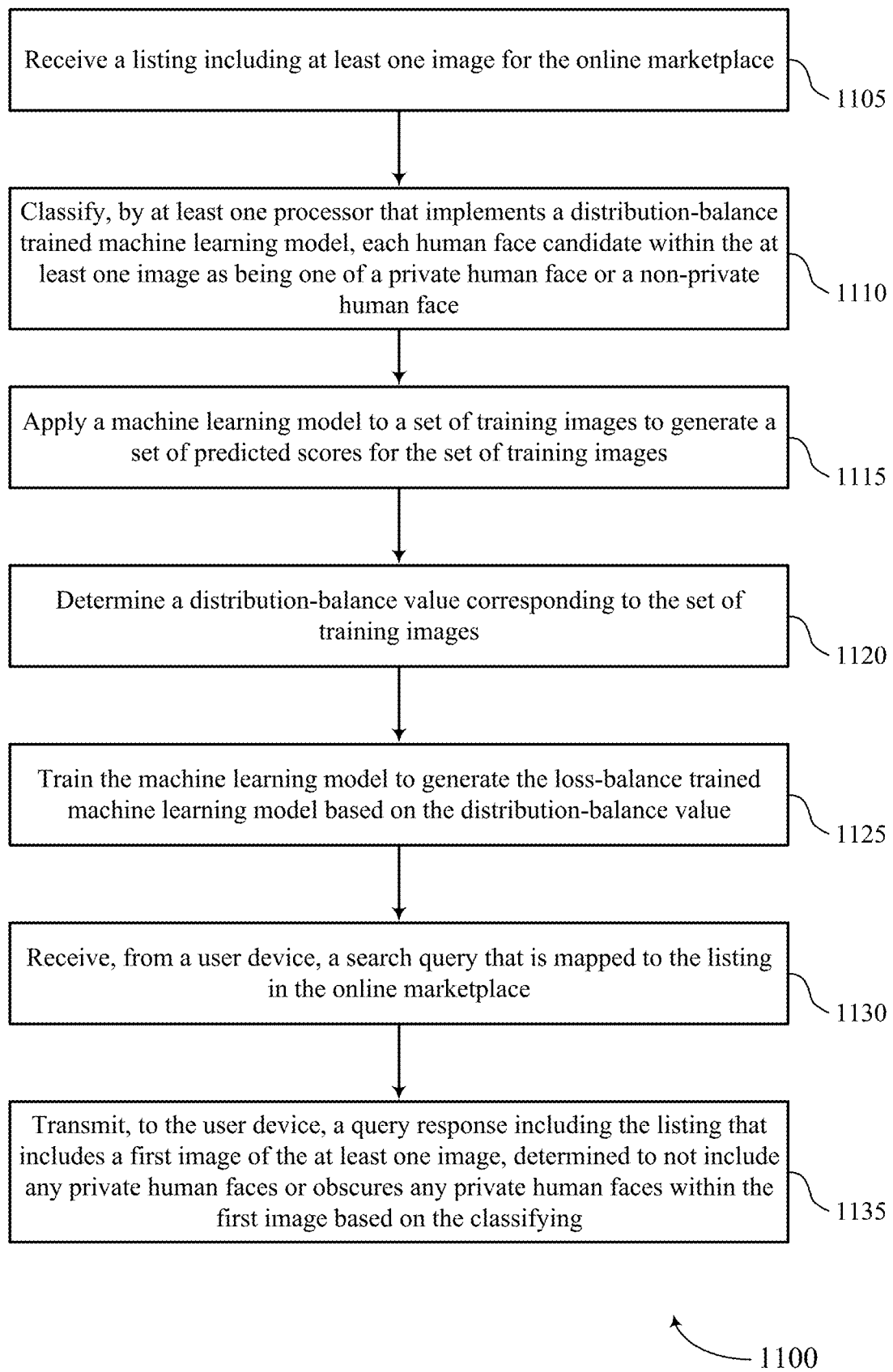

FIG. 11 shows a flowchart illustrating a method 1100 that supports face detection to address privacy in publishing image datasets in accordance with aspects of the present disclosure. The operations of method 1100 may be implemented by a database server or its components as described herein. For example, the operations of method 1100 may be performed by a face detection component as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1105, the database server may receive a listing including at least one image for the online marketplace. The operations of 1105 may be performed according to the methods described herein. In some examples, aspects of the operations of 1105 may be performed by a listing reception component as described with reference to FIGS. 6 through 8.

At 1110, the database server may classify, by at least one processor that implements a distribution-balance trained machine learning model, each human face candidate within the at least one image as being one of a private human face or a non-private human face. The operations of 1110 may be performed according to the methods described herein. In some examples, aspects of the operations of 1110 may be performed by a face classification component as described with reference to FIGS. 6 through 8.

At 1115, the database server may apply a machine learning model to a set of training images to generate a set of predicted scores for the set of training images. The operations of 1115 may be performed according to the methods described herein. In some examples, aspects of the operations of 1115 may be performed by a machine learning component as described with reference to FIGS. 6 through 8.

At 1120, the database server may determine a distribution-balance value corresponding to the set of training images. The operations of 1120 may be performed according to the methods described herein. In some examples, aspects of the operations of 1120 may be performed by a distribution-balance component as described with reference to FIGS. 6 through 8.

At 1125, the database server may train the machine learning model to generate the distribution-balance trained machine learning model based on the determined distribution-balance value. The operations of 1125 may be performed according to the methods described herein. In some examples, aspects of the operations of 1125 may be performed by a machine learning component as described with reference to FIGS. 6 through 8.

At 1130, the database server may receive, from a user device, a search query that is mapped to the listing in the online marketplace. The operations of 1130 may be performed according to the methods described herein. In some examples, aspects of the operations of 1130 may be performed by a search query component as described with reference to FIGS. 6 through 8.

At 1135, the database server may transmit, to the user device, a query response including the listing that includes a first image of the at least one image determined to not include any private human faces or obscures any private human faces within the first image based on the classifying. The operations of 1135 may be performed according to the methods described herein. In some examples, aspects of the operations of 1135 may be performed by a query response component as described with reference to FIGS. 6 through 8.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available non-transitory medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer implemented method for face classification in an online marketplace, comprising:
   receiving a listing comprising at least one image for the online marketplace;
   classifying, by at least one processor that implements a distribution-balance trained machine learning model, each human face candidate within the at least one image as being one of a private human face or a non-private human face;
   receiving, from a user device, a search query that is mapped to the listing in the online marketplace; and
   transmitting, to the user device, a query response comprising the listing that includes a first image of the at least one image determined to not include any private human faces or obscures any private human faces within the first image based at least in part on the classifying.

2. The computer implemented method of claim 1, further comprising:
   outputting a set of one or more images of the at least one image, or an indication of the one or more images in the set, that each include at least one private human face based at least in part on the classifying.

3. The computer implemented method of claim 1, further comprising:
   outputting a set of one or more images of the at least one image, or an indication of the one or more images in the set, determined to not include any private human faces based at least in part on the classifying.

4. The computer implemented method of claim 1, further comprising:
   receiving the search query that is mapped to a listing that comprises the first image; and
   transmitting, based at least in part on the search query, the query response comprising the listing and the first image based at least in part on each human face candidate within the first image being classified as a non-private human face.

5. The computer implemented method of claim 1, further comprising:
   receiving the search query that is mapped to a listing that comprises a second image of the at least one image; and
   transmitting, based at least in part on the search query, the query response comprising the listing without the second image based at least in part on at least one human face candidate within the second image being classified as a private human face.

6. The computer implemented method of claim 1, further comprising:

applying a machine learning model to a plurality of training images to generate a plurality of predicted scores for the plurality of training images;

determining a distribution-balance value corresponding to the plurality of training images; and training the machine learning model to generate the distribution-balance trained machine learning model based at least in part on the determined distribution-balance value.

7. The computer implemented method of claim 6, wherein each training image of the plurality of training images is assigned a training score to indicate that the respective training image includes at least one private human face or at least one non-private human face without any private human faces.

8. The computer implemented method of claim 6, wherein determining the distribution-balance value comprises:

determining the distribution-balance value based at least in part on a ratio of private to non-private human faces in the plurality of training images.

9. The computer implemented method of claim 6, wherein training the machine learning model comprises:

training the machine learning model, based at least in part on the determined distribution-balance value, to generate an updated machine learning model;

applying the updated machine learning model to the plurality of training images to generate a second plurality of predicted scores for the plurality of training images;

determining an aggregate error value based at least in part on the second plurality of predicted scores and a plurality of training scores for the plurality of training images; and training the updated machine learning model to generate the distribution-balance trained machine learning model based at least in part on the aggregate error value.

10. The computer implemented method of claim 1, wherein the non-private human face comprises a non-human face, a published human face, a public figure human face, a drawing of a human face, or any combination thereof.

11. A system for face classification in an online marketplace, comprising:

one or more processors; and a computer readable medium storing instructions that, when executed by the one or more processors, cause the system to perform operations comprising:

receiving a listing comprising at least one image for the online marketplace;

classifying, by the one or more processors that implement a distribution-balance trained machine learning model, each human face candidate within the at least one image as being one of a private human face or a non-private human face;

receiving, from a user device, a search query that is mapped to the listing in the online marketplace; and transmitting, to the user device, a query response comprising the listing that includes a first image of the at least one image determined to not include any private human faces or obscures any private human faces within the first image based at least in part on the classifying.

12. The system of claim 11, wherein the instructions are further executable to perform operations comprising:

outputting a set of one or more images of the at least one image, or an indication of the one or more images in the set, that each include at least one private human face based at least in part on the classifying.

13. The system of claim 11, wherein the instructions are further executable to perform operations comprising:

outputting a set of one or more images of the at least one image, or an indication of the one or more images in the set, determined to not include any private human faces based at least in part on the classifying.

14. The system of claim 11, wherein the instructions are further executable to perform operations comprising:

receiving the search query that is mapped to a listing that comprises the first image; and transmitting, based at least in part on the search query, the query response comprising the listing and the first image based at least in part on each human face candidate within the first image being classified as a non-private human face.

15. The system of claim 11, wherein the instructions are further executable to perform operations comprising:

receiving the search query that is mapped to a listing that comprises a second image of the at least one image; and transmitting, based at least in part on the search query, the query response comprising the listing without the second image based at least in part on at least one human face candidate within the second image being classified as a private human face.

16. The system of claim 11, wherein the instructions are further executable to perform operations comprising:

applying a machine learning model to a plurality of training images to generate a plurality of predicted scores for the plurality of training images;

determining a distribution-balance value corresponding to the plurality of training images; and training the machine learning model to generate the distribution-balance trained machine learning model based at least in part on the determined distribution-balance value.

17. The system of claim 16, wherein each training image of the plurality of training images is assigned a training score to indicate that the respective training image includes at least one private human face or at least one non-private human face without any private human faces.

18. The system of claim 16, wherein determining the distribution-balance value comprises:

determining the distribution-balance value based at least in part on a ratio of private to non-private human faces in the plurality of training images.

19. The system of claim 16, wherein training the machine learning model comprises:

training the machine learning model, based at least in part on the determined distribution-balance value, to generate an updated machine learning model;

applying the updated machine learning model to the plurality of training images to generate a second plurality of predicted scores for the plurality of training images;

determining an aggregate error value based at least in part on the second plurality of predicted scores and a plurality of training scores for the plurality of training images; and training the updated machine learning model to generate the distribution-balance trained machine learning model based at least in part on the aggregate error value.

20. A non-transitory computer-readable medium for face classification in an online marketplace, storing instructions which, when executed by a processor, cause the processor to perform operations comprising:

receiving a listing comprising at least one image for the online marketplace;

classifying, by the processor that implements a distribution-balance trained machine learning model, each human face candidate within the at least one image as being one of a private human face or a non-private human face;

receiving, from a user device, a search query that is mapped to the listing in the online marketplace; and transmitting, to the user device, a query response comprising the listing that includes a first image of the at least one image determined to not include any private human faces or obscures any private human faces within the first image based at least in part on the classifying.

* * * * *